United States Patent [19]
Karashima et al.

[11] Patent Number: 5,123,693
[45] Date of Patent: Jun. 23, 1992

[54] COVERED WELT FOR VEHICLE

[75] Inventors: Hiroki Karashima; Toshiaki Yamaguchi, both of Chiba, Japan

[73] Assignee: Kinugawa Rubber Industrial Co., Ltd., Chiba, Japan

[21] Appl. No.: 799,870

[22] Filed: Dec. 2, 1991

Related U.S. Application Data

[63] Continuation of Ser. No. 500,707, Mar. 28, 1990, abandoned.

[30] Foreign Application Priority Data

Mar. 29, 1989 [JP] Japan .................. 1-76909

[51] Int. Cl.⁵ .................. E06B 7/16
[52] U.S. Cl. .................. 296/135; 49/475; 49/491
[58] Field of Search .................. 296/135, 146; 49/490, 49/491, 500, 475

[56] References Cited

U.S. PATENT DOCUMENTS

| | | | |
|---|---|---|---|
| Re. 21,337 | 1/1940 | Hamm | 49/500 |
| 2,144,082 | 1/1939 | Randall | 49/500 |
| 2,655,698 | 10/1953 | Chalik et al. | 49/500 X |
| 2,898,648 | 8/1959 | Bright | 49/500 X |
| 3,195,948 | 7/1965 | Stuortevant et al. | 296/146 |
| 3,416,981 | 12/1968 | Figaro | 49/500 X |
| 3,952,383 | 4/1976 | Moore et al. | 296/135 X |
| 4,656,086 | 2/1987 | Bowers . | |
| 4,902,549 | 2/1990 | Bright et al. | 49/490 X |
| 4,918,867 | 4/1990 | Hayashi et al. | 49/490 |

FOREIGN PATENT DOCUMENTS

| | | | |
|---|---|---|---|
| 3411559 | 10/1985 | Fed. Rep. of Germany | 296/146 |
| 3528201 | 2/1986 | Fed. Rep. of Germany | 296/146 |
| 2519399 | 7/1983 | France | 296/146 |
| 1293249 | 3/1939 | Japan . | |
| 34954 | 2/1984 | Japan | 296/146 |
| 76420 | 4/1985 | Japan | 296/146 |
| 62-227837 | 6/1987 | Japan . | |
| 273137 | 11/1987 | Japan | 296/146 |
| 588898 | 6/1947 | United Kingdom | 49/490 |
| 634726 | 3/1950 | United Kingdom | 49/500 |
| 711371 | 6/1954 | United Kingdom | 49/490 |
| 944185 | 12/1963 | United Kingdom | 49/490 |

*Primary Examiner*—Margaret A. Focarino
*Assistant Examiner*—Joseph D. Pape
*Attorney, Agent, or Firm*—Bachman & LaPointe

[57] ABSTRACT

A welt with a fabric covering for a vehicle is disclosed. This welt includes a U-shaped portion for covering an edge of an opening of the vehicle, a rubber seal elastically deformable against shock caused by closing doors, and a fabric sheet wrapping about an area ranging from the U-shaped portion to the rubber seal. Both sides of the fabric are bonded tightly by one adhesive while another area is bonded by a different, pressure sensitive adhesive so as to allow the fabric to be deformed flexibly when the welt is bent.

10 Claims, 1 Drawing Sheet

COVERED WELT FOR VEHICLE

This is a continuation of co-pending application Ser. No. 07/500,707 filed on Mar. 28, 1990, now abandoned.

BACKGROUND OF THE INVENTION

1. Technical Field

The present invention relates generally to a covered welt for covering edges of an opening of a vehicle for example.

2. Background Art

A covered welt which is typically attached to an inner peripheral edge of an opening of a vehicle to be sealed by such as a closed door, for example, is well known in the art. Such a covered welt is usually formed with a U-shaped portion in the cross section thereof including a plurality of inner lips which are integrally formed on inner surfaces of side walls of the U-shaped portion, a curved cover lip which extends outwardly from the side wall of the U-shaped portion for receiving a distal portion of a roof garnish, and a C-shaped sponge rubber seal which is attached to the other side wall. The U-shaped portion wraps a flange which is bonded to an inner panel and an outer panel of a roof side rail of a vehicle body with tight engagement of the inner lips with the flange. The C-shaped sponge rubber seal is elastically deformable against shock caused by inner peripheral edges of a door when being closed. Fabric is attached over an outer surface ranging from an end of the sponge rubber to an end of the curved cover lip in a manner by which it is bonded by a pre-applied adhesive which is disposed all over the outer surface.

As an adhesive, two-part adhesives containing heat resistant curing agents or a hot-melt adhesives, for example, are typically used.

However, bonding of the fabric on the sponge rubber seal using a two-part adhesive or a hot-melt adhesive requires that the fabric remain pushed against the surface of the sponge rubber seal until the adhesive is hardened, due to lack of coking properties and lack of sufficient adhesion between the fabric and the rubber surface at the beginning of bonding. This results in complicated bonding operations and serious operational efficiency problems.

Additionally, a two-part adhesive must be bonded within a curing time (pot life) during reaction of the two adhesives because the adhesive strength soon disappears due to curing after mixing the two agents of the adhesive. Control of pot life is difficult and results in complicated bonding operations.

Hot-melt adhesives become extremely hardened after attachment to the fabric with the result that the fabric is tightly attached to the U-shaped portion and the sponge rubber seal, thereby preventing relative movement therebetween. For this reason, if the U-shaped portion is bent along an edge of an opening of a vehicle when it is installed, the fabric does not follow the bend, causing tensile force to occur. It will be thus noted that separation between the fabric and the curved cover lip tends to be generated, resulting in difficult installation. Further, an elastic reaction of the sponge rubber seal caused by the hardening of the adhesive results in excessive elasticity and thereby, poor sealing for doors, windows, etc.

SUMMARY OF THE INVENTION

It is accordingly a general object of the present invention to avoid the disadvantages of the prior art.

It is another object of the invention to provide a covered welt which is manufactured easily without compromising the mechanical properties thereof.

According to one aspect of the present invention, there is provided a welt for a vehicle which comoprises a strip portion contoured for covering an edge of an opening of the vehicle, fabric wrapping around a surface of the strip portion, an adhesive layer interfacing between each longitudinal edges of the fabric and corresponding areas of the surface of the strip portion to bond fixedly therebetween, and a pressure sensitive adhesive layer provided between the strip portion and the fabric to bond therebetween so as to maintain an interfacing condition to allow the fabric to move relatively to the strip portion when the strip portion is bent.

According to another aspect of the present invention, there is provided a welt for a vehicle which comprises a strip portion contoured for covering an edge of an opening of the vehicle, and fabric, wrapped about an outer surface of the strip portion, both longitudinal edges of the fabric being attached to the outer surface by a first adhesive and the other portions thereof being attached by a second, pressure sensitive, adhesive.

According to a further aspect of the present invention, there is provided a method for attaching fabric to a seal member to form a welt which comprises the steps of applying a pressure sensitive adhesive to a main area of the seal member, wrapping the main area of the seal member with the fabric to attach the fabric closely to the seal member, and applying an adhesive to both sides of the fabric to fixedly bond between the sides and the seal member.

BRIEF DESCRIPTION OF THE DRAWINGS

The present invention will be understood from the detailed description given hereinbelow and from the accompanying drawings of the preferred embodiment of the invention. The description however, is not intended to limit the invention to the specific embodiment but is for explanation and understand only.

DESCRIPTION OF THE PREFERRED EMBODIMENT

Figure 1:
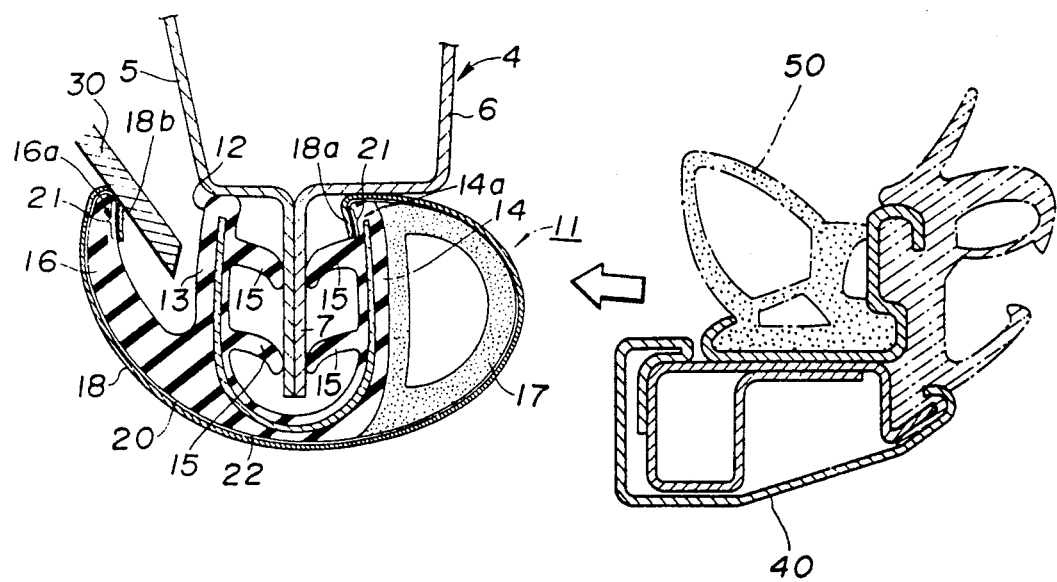
FIG. 1 is a cross sectional view which shows a covered welt according to the invention, installed on a flange of an opening of a vehicle.

Referring now to FIG. 1, a covered welt for a vehicle according to the instant invention is shown. The shown welt 11 covers an upper edge 7 which is bonded to an outer side panel 6 and an inner side panel 5 of a roof side rail 4 of a vehicle body. The welt 11 includes a U-shaped strip portion 12 (in cross section), a plurality of inner lips 15 which are integrally formed on inner surfaces of side walls 13 and 14 of the U-shaped strip portion, a curved cover lip 16 which extends outwardly from the side wall 13 of the U-shaped strip portion for receiving a distal end of a roof garnish 30, a C-shaped sponge rubber seal 17 which is attached to the side wall 14, and a fabric strip 18 which is bonded over an area ranging from the sponge seal 17 to the curved cover lip 16. The sponge rubber seal 17 is elastically deformable against shock caused by an inner edge of a door panel 40 when being closed. A weatherstrip 50 is attached to an upper portion of the door panel 40 for sealing between a door and the outer side panel 6.

The U-shaped strip portion 12, the inner lips 15, and the curved cover lip 16 are made of rubber, or a synthetic resin such as polyvinyl chloride (PVC).

Both sides 18a and 18b of the fabric strip 18 are bonded to areas 14a and 16a inside the top ends of the cover lip 16 and the side wall 14 of the U-shaped strip portion 12 by adhesives 21 respectively. This adhesive 21 may be a conventional two-part adhesive of urethane or epoxy, or a hot-melt adhesive of urethane, nylon, polyester, or EVA. Other areas of the fabric 18, other than the ends 18a and 18b are bonded to an outwardly exposed outer surface 20 ranging from the top of the curved cover lip 16 to the top of the side wall 14 through the sponge rubber seal 17 and the U-shaped strip by a pressure sensitive adhesive 22. This adhesive may be acrylic, copolymer or polyvinyl ether.

In attaching the fabric 18 to the outer surface 20 of the curved cover lip 16, and the sponge rubber seal 17, the pressure sensitive adhesive 22 is pre-applied on all area of the outer surface 20. Subsequently, the fabric 18 is wrapped about the outer surface 20 to stick thereon closely due to the pressure sensitive adhesive 22. With this arrangement, the ends 18a and 18b of the fabric 18 are attached on the inside areas 14a and 16a of the side wall 14 of the U-shaped strip portion 12 and the curved cover lip 16 by the adhesive 21 respectively. As for the adhesive 21, when using a two-part adhesive, it is applied onto outer surfaces of the sides 18a and 18b of the fabric 18 which have been wrapped inwardly about the inside areas 14a and 16a and allowed to harden. When using a hot-melt adhesive, this adhesive is applied to the sides 18a and 18b in the same manner as above and is then heated by a heat plate or a welder to fixedly bond the fabric 18 thereto. Alternatively, application of the hot-melt adhesive may be effected in a manner in which it is pushed from a die with extrusion of the welt 11 therefrom. Additionaly, the hot-melt adhesive may be pre-applied to the sides 18a and 18b of the fabric 18 and after wrapping the fabric about the curved cover lip 16 to the sponge rubber seal 17, it is then heated to bond.

In the bonding operation, the fabric 18, closely contacts the outer surface 20 by means of the pressure sensitive adhesive 22, this prevents it from being separated from the outer surface 20 and thus holding of the fabric against the outer surface until the adhesive is hardened is unnecessary. It will be appreciated that the bonding operation for the fabric is very easy. Further, the two-part adhesive does not necessitate control of pot life.

After fixing the sides 18a and 18b of the fabric 18, the fabric is allowed to move relative the outer surface 20 as the area other than the ends 18a and 18b are bonded thereon by the flexibly deformable pressure sensitive adhesive 22. In other words, the fabric is deformable flexibly according to deformation of the welt when it is bent. Therefore, when the welt is installed on a flange of an opening of a vehicle body, the construction of the welt allows the U-shaped strip portion 12 to be folded freely without tensioning by the fabric, providing easy installation. Further, relative movement between the fabric 18 and the sponge rubber seal 17 prevents the elastic reaction of the seal from increasing, providing appropriate closing operation of doors.

It should be understood that the invention is not limited to the particular embodiment shown and described herein, but that various changes and modifications may be made without departing from the sprit and scope of the invention as defined by the following claims.

What is claimed is:

1. A welt for a vehicle comprising:
   a strip portion contoured for covering an edge of an opening of the vehicle, said strip portion including a U-shaped portion in cross-section for wrapping about the edge of the vehicle opening, said U-shaped portion having spaced apart side walls, said strip portion also including side areas and side surfaces;
   a fabric wrapping around the side surfaces of said strip portion, said fabric having spaced apart edges;
   an adhesive layer interfacing between each edge of said fabric and respective side areas of said strip portion to bond fixedly therebetween;
   a pressure sensitive adhesive layer provided between said strip portion and said fabric to hold therebetween so as to maintain an interfacing condition to allow said fabric to move relatively to said strip portion when the strip portion is bent;
   an elastically deformable seal attached to a first one of said side surfaces of said strip portion, said fabric covering an area ranging from said seal to said strip portion;
   a plurality of lips formed on the side walls of the U-shaped portion, said lips being spaced from the elastically deformable seal;
   said strip portion including a curved cover lip extending outwardly from said U-shaped portion from a side of said U-shaped portion opposite to said seal, said cover lip forming a second one of said side surfaces and one of said side areas of said strip portion; and
   said fabric being attached to the one side area and second side surface of the strip portion formed by the curved cover lip.

2. A welt according to claim 1 wherein said lips engage a end of the vehicle opening.

3. A welt according to claim 1 wherein a side wall of the U-shaped portion forms one of said side surfaces of the strip portion.

4. A welt as set forth in claim 1, wherein said adhesive layer is selected from the group consisting of a two-part adhesive and a hot melt adhesive and said pressure sensitive adhesive layer is selected from the group consisting of an acrylic ether, a copolymer and a polyvinyl ether adhesive.

5. A welt as set forth in claim 1, wherein said strip portion is made of rubber.

6. A welt as set forth in claim 1, wherein said strip portion is made of synthetic resin.

7. A welt for a vehicle comprising:
   a strip portion made of resilient material and contoured for covering an edge of an opening of the vehicle, said strip portion including first and second sections, the first section elastically engaging with the edge of the opening, the second section facing in a direction opposite the edge of the opening, said second section having side areas and side surfaces;
   fabric wrapping about the second section of said strip portion, said fabric having spaced-apart edges;
   first adhesive layers interfacing between the side areas of the second section of the strip portion and the edges of said fabric in a direction to bond fixedly therebetween;

a second flexibly deformable pressure sensitive adhesive layer provided between the side surfaces of said strip portion and the fabric to hold therebetween so as to maintain an interfacing condition which allows said fabric to move relatively to the second section of the strip portion when the strip portion is bent.

8. A welt as set forth in claim 7 further including an elastically deformable seal attached to a portion of the second section of the strip portion, said fabric covering the second section of the strip portion over the seal.

9. A welt as set forth in claim 8 wherein said seal is attached to a side surface.

10. A welt as set forth in claim 8 wherein said strip portion includes a U-shaped portion in cross-section having inside walls, outside walls and a plurality of lips formed on the inside walls and spaced from the seal, said first section including said inside walls of said U-shaped portion and said plurality of lips and said second section including said outside walls of said U-shaped portion, and said strip portion further comprising a curved cover lip extending outwardly from a portion of the U-shaped portion opposite to said seal, wherein the seal, the U-shaped portion and the curved cover lip define a common outer surface wrapped by the fabric.

* * * * *